J. E. DUNHAM.
EXTERMINATOR.
APPLICATION FILED FEB. 9, 1915.
1,153,044.
Patented Sept. 7, 1915.
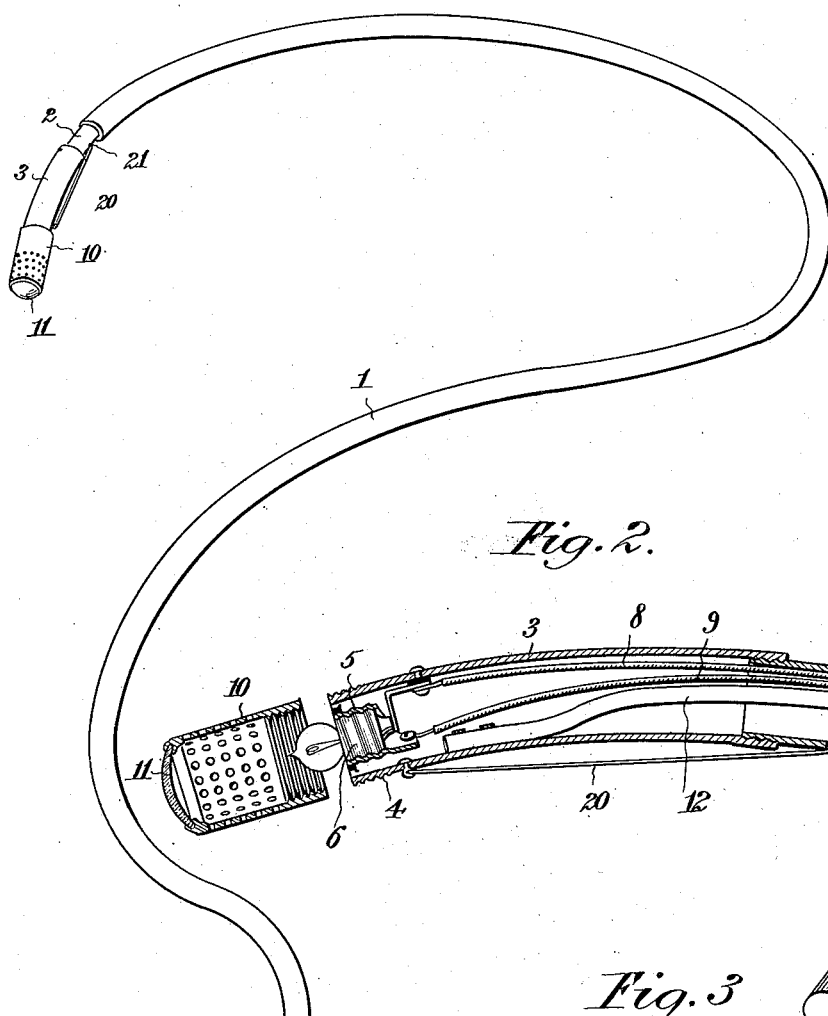

UNITED STATES PATENT OFFICE.

JAMES E. DUNHAM, OF PORTLAND, OREGON.

EXTERMINATOR.

1,153,044.   Specification of Letters Patent.   Patented Sept. 7, 1915.

Application filed February 9, 1915. Serial No. 7,187.

*To all whom it may concern:*

Be it known that I, JAMES E. DUNHAM, a citizen of the United States, residing at Portland, in the county of Multnomah and State of Oregon, have invented new and useful Improvements in Exterminators, of which the following is a specification.

This invention relates to animal exterminators or extrusioners.

The object of the invention is the provision of a novel instrument for use in animal extermination or for extruding them from their dens.

A further object of the invention is the provision of a device which may be used for killing an animal in his den, or for extruding the animal from his den either by smoking, fright or twisting.

Another object of the invention is to provide a device of this character which may be simply and cheaply constructed, which may be conveniently carried from place to place and which will be effective to kill animals or extrude them from their dens.

Further objects of the invention will appear as the following description is read in connection with the accompanying drawing, which forms a part of this application, and in which—

Figure 1 is a diagrammatic view. Fig. 2 is a longitudinal sectional view of the flexible tip and associated parts separated therefrom. Fig. 3 is a perspective view of the twisting head to be used in connection with the device.

Referring more particularly to the drawing, 1 represents a flexible tube which may be constructed of any suitable material and made of any suitable length and which has connected to it by means of the union or nipple 2 a flexible tip 3 provided upon its outer end with external threads 4 and a threaded socket 5. The socket 5 is arranged to receive an incandescent bulb 6 which is connected to a battery 7 by conductors 8 and 9 which pass through the tube and have their terminals connected to insulated portions of the socket, as is customary in lighting fixtures. The external threads 4 are adapted to receive an internally threaded cap 10 having an ordinary bull's eye lens 11 in its outer end. This cap may be perforated, as shown, so as to permit the passage of smoke or other fumes which communicate with the socket 5 through a tube 12 and is generated in the fire pot or tank 13 or a cap without the bull's eye may be employed if desired. The tank or fire pot has a perforated diaphragm or bottom 14 upon which the coals are adapted to rest and below the diaphragm or bottom 14 there is connected to the fire pot a blower 15, here shown in the form of a valve bulb connected to the fire pot by means of a tube 16. The tube 12 communicates with the upper portion of the fire pot and the fire pot is made airtight by a lid 17. The pipe 12 passes through the tube 1 and as before stated communicates with the socket 5 so that sulfur or other similar fumes or smoke may be forced into the den to either kill the animal therein or to drive him out.

If desired, a cap 18 having a multiple barb spear 19 may be screwed upon threads 4 and twisted into the hide of the animal so that he may be forcibly pulled out of his den, the tube 1 being twisted to effect such a result and the flexible tip being turned in any suitable direction to accomplish this purpose by means of the cable 20 which passes through an aperture 21 in the nipple 2 and has one terminal connected to the free end of the tip and the opposite portion extending through the tube 1 and being supplied at its opposite terminal with a manipulating ring or handle 22. By turning the tube 1 and manipulating the cable 20 the tip may be moved in any direction.

When it is desired to kill an animal in his den the flexible tip is worked through the passage into the den by operating the tube 1 and manipulating the tip 3 through the cable 20. In this instance the tip contains either an ordinary cap or a cap on the order of that shown at 10 and preferably without the incandescent bulb 6. Sulfur or other similar fumes are generated in the fire pot 13 and blown through the pipe 12 by pressure upon the valve bulb 15. If it is desired to smoke the animal out of the den the same procedure is adapted but rotten wood or similar material is placed in the fire pot 13. The electric lamp may be used in connection with this extrusion method and will greatly facilitate the operation owing to the fact that all wild animals have extreme antipathy to fire or anything that resembles fire.

The tip 18 is only used where it is desired to pull the animal out of the hole or den and it is operated by turning the tube 1 so as to twist the barbs into the hide of the animal. It is, of course, understood that the pipe 12, conductors 8 and 9 and cable 20 have sufficient flexibility to permit their movement with the flexible tube 1 into any path traversed by the passage to the den.

What is claimed is:—

1. A device of the class described comprising a flexible pipe, a flexible tubular tip connected thereto, means for manipulating the tip, means for forcing fumes through the pipe to the tip, conductors passing through the pipe and flexible tip and connected to a source of electrical energy, an incandescent bulb connected in the circuit, and apertured caps removably connected to the tip.

2. A device of the class described comprising a flexible pipe, a flexible tubular tip connected thereto, means for manipulating the tip, means for forcing fumes through the pipe to the tip, conductors passing through the pipe and flexible tip and connected to a source of electrical energy, an incandescent bulb connected in the circuit, and a cap removably threaded upon the tip and covering said incandescent bulb and having a lens therein.

In testimony whereof I affix my signature in presence of two witnesses.

JAMES E. DUNHAM.

Witnesses:
F. H. SMITH,
F. BALDEN.